Sept. 21, 1965  G. S. SCARVELIS ETAL  3,207,820
METHOD OF PREPARING POLYSTYRENE BEADS FOR MOLDING
Filed April 9, 1962
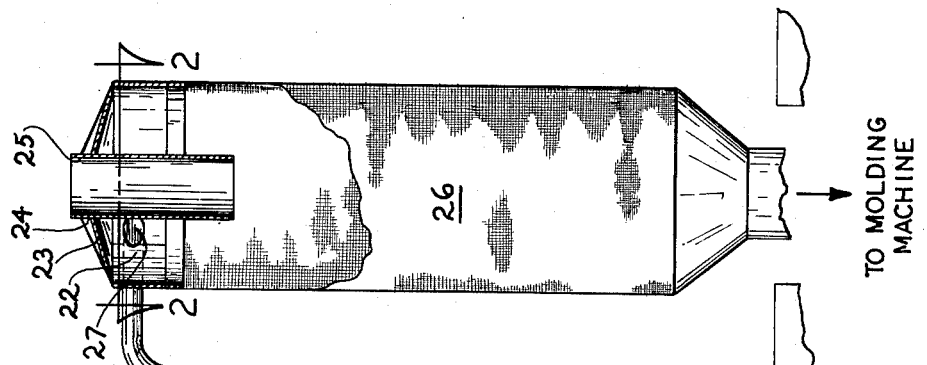
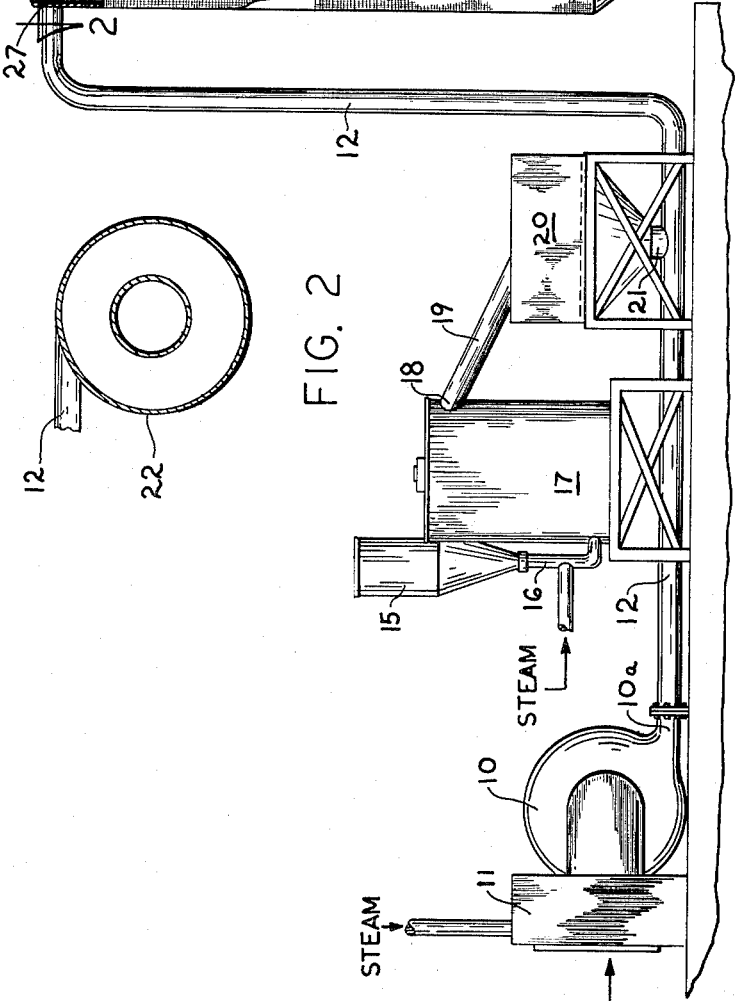
INVENTORS
GUS S. SCARVELIS
GEORGE R. ZALOUDEK
BY
J. F. Teigland
W. A. Schaich
ATTORNEYS

United States Patent Office 3,207,820
Patented Sept. 21, 1965

3,207,820
METHOD OF PREPARING POLYSTYRENE BEADS FOR MOLDING
Gus S. Scarvelis and George R. Zaloudek, Toledo, Ohio, assignors to Owens-Illinois Glass Company, a corporation of Ohio
Filed Apr. 9, 1962, Ser. No. 185,895
5 Claims. (Cl. 264—53)

This invention relates to a method of preparing polystyrene beads for molding, and more particularly to a method of preparing polystyrene beads for direct use without aging.

Expandable or foamable polystyrene beads are commonly supplied in the form of polystyrene granules containing a volatile blowing agent, such as pentane. At temperatures which permit the polystyrene beads to deform, the blowing agent or gas expands and the bead mass forms a foamed or cellular structure. Expandable polystyrene beads are commonly pre-expanded, by the application of steam or hot water prior to a molding operation where further expansion occurs. In the conventional process, after the polystyrene beads have been pre-expanded, it is necessary to "age" or store them for a period of time prior to the molding operation. The aging of polystyrene beads which takes six to twenty-four hours serves a two-fold purpose.

First, the beads after they have been pre-expanded, such as by means of steam, are wet and stick together thereby hampering or preventing them from being continuously fed by automatic feeding equipment; and second, the presence of water on the bead tends to cool the bead and the gas contained therein, whereby the internal pressure of the bead becomes less than the atmospheric pressure. This creates an undesirable pressure differential which leads to a fragile bead. Aging of the beads allows the beads to dry thereby permitting them to be continuously and uniformly fed by automatic feeding equipment. Aging also allows the pressure within the bead to become equalized with the atmospheric pressure thereby allowing the bead to withstand greater external forces. Without aging, the beads would collapse under the external forces imposed by ordinary molding pressures, which are on the order of 5–40 p.s.i.g.

Typically, the aging process is accomplished by storing or aging the beads in silo-like hoppers for the required time of six to twenty-four hours. Since the beads have a relatively low density, e.g., two pounds per cubic foot, continuous high speed molding equipment, using a large volume of bead per hour, requires a large storage area to maintain a backlog of beads for a six to twenty-four hour production period.

Accordingly, it is an object of this invention to provide a method of preparing the pre-expanded polystyrene beads for use immediately subsequent to their pre-expansion and without the necessity of aging the beads.

Another object of this invention is to provide a method for equalizing the internal pressure of pre-expanded polystyrene beads to permit them to be molded immediately subsequent to their being pre-expanded.

Other objects and advantages of this invention will become apparent from the following description taken in conjunction with the accompanying drawings wherein are set forth, by way of illustration and example, the preferred embodiments of this invention.

In the drawings:
FIG. 1 is a schematic view of the apparatus used to practice the method of this invention; and
FIG. 2 is a sectional view taken along the line 2—2 of FIG. 1 showing the cyclone separator used to separate the moisture laden atmosphere from the beads.

Basically, the method of this invention comprises conveying the pre-expanded polystyrene beads from a pre-expander into a pneumatic conveyor wherein the beads are conveyed in a heated atmosphere, with the heated atmosphere heating the beads to substantially the same temperature to which they were heated in the pre-expander and also preventing moisture condensation on the beads, separating the moisture laden atmosphere from the beads, and conveying the beads into a hopper from which they are fed directly into a molding machine.

The expandable polystyrene beads used with this invention can be, for example, Dylite expandable polystyrene beads manufactured by Koppers Company, Inc., of Pittsburgh, Pennsylvania, or Pelasan polystyrene beads manufactured by Dow Chemical Company, of Midland, Michigan.

Referring to FIG. 1, the means used to convey the beads in the method of this invention comprise a suitable conventional blower 10. The blower 10 has connected to its intake side, by suitable ducting, a conventional steam operated heat exchanger or heater 11 which serves to heat the air as it enters the intake side of the blower 10. At the output side 10a of the blower 10 is an air duct 12 which leads from the blower to a cyclone separator 14 which will be described hereinafter.

The virgin or unexpired polystyrene beads are stored in a hopper 15 and are fed therefrom through a pipe 16 to the input side of the conventional steam operated pre-expander 17. One type of such pre-expander is the Rodman Steam Pre-Expander, manufactured by Artisan Metal Products Company, Waltham, Massachusetts. The beads enter the bottom of the pre-expander where they are expanded by the action of the steam. As the beads expand, they displace the more completely expanded beads, thus causing the product to move upwardly and discharge through the outlet 18 into a chute or trough 19. From the outlet 18 of the pre-expander 17 the beads are fed through the trough 19 to a suitable conventional mechanical separator 20 which separates the beads and eliminates any cohesion between the beads that may have occurred in the expander. The separator 20 comprises a mesh screen through which the beads are fed by a suitable conventional mechanical vibrator or stirrer. The output side of the separator 20 is connected to the air duct 12 by a section of ducting 21.

The cyclone separator 14 comprises a cylindrical portion 22 which has mounted on its upper peripheral edge a conical portion 23. The conical portion 23 has a central circular opening 24. A circular tube or pipe 25 extends through the opening 24 in the conical portion 23 and is secured thereto. The outlet end of the duct 12 is tangentially secured to the cylindrical portion 22 at 27. A silo-like hopper 26 is secured to the lower end of the cylindrical portion 22. The hopper 26 is preferably formed of canvas or similar material which is air porous and will retain the beads. The beads, as will be described later, are fed directly from the hopper to a molding machine. The molding machine, for example, can comprise a polystyrene foamboard machine, in which the pre-expanded beads are fed between two liners of kraft paper and are finally expanded and coalesced in situ to form a foamed resin core paper laminate.

In the practice of the preferred method of this invention, air heated to a temperature of approximately 210° F. by the heater 11 is fed into the intake side of the blower 10, to thereby maintain the air temperature in the conduit or duct 12 at approximately 190° F. Virgin or unexpanded polystyrene beads are fed into the pre-expander 17 and pre-expanded to a density of approximately two pounds per cubic foot, and then fed into the separator 20. To achieve a density of approximately one to two pounds per cubic foot the beads are heated in the pre-expander to a temperature of 225° F. The mass of pre-expanded beads is broken apart by the separator 20, thereby allowing the beads to fall into the air duct 12. The pre-expanded beads are conveyed by the high velocity heated air within the duct into the cyclone separator 14 through an inlet 27 which is mounted tangential to the upper circular portion 22 of the cyclone separator. Since the beads are fed tangentially into the separator, they swirl around the pipe 25 until they lose their velocity and fall into the hopper 26. The heated moisture-laden air is forced outwardly through the opening pipe 25 due to the pressure of the incoming air. The air exiting from the separator 14 does not have sufficient velocity to carry the expanded beads with it. The porous structure of the hopper also aids in allowing the escape of moisture laden air. The beads in the hopper, which serves as a temporary storage to insure a continuous supply of beads, are dry and heated to a temperature of approximately 110°–200° F., which is sufficient to prevent bead collapse during molding. The beads are then fed directly to the continuous molding machine. Because of the heated condition of the beads they are able to withstand the greater external forces, e.g., 5–40 p.s.i.g. encountered during the molding operation. Also because they are in a heated condition, the heating requirements for further expansion in the molding operation are less. The dry beads are also capable of being continuously fed in a uniform manner without sticking together.

It will, of course, be understood that various details of construction and operation may be modified through a wide range without departing from the principles of this invention, and it is not, therefore, the purpose to limit the patent granted hereon otherwise than necessitated by the scope of the appended claims.

We claim:

1. A method of conditioning wet, pre-expanded polystyrene beads for immediate molding, which comprises, conveying said wet pre-expanded beads in a heated atmosphere, whereby said beads are heated and the moisture of the beads transferred to the atmosphere, and separating said moisture laden atmosphere from said beads.

2. A method of preparing expandable polystyrene beads for molding, which comprises, pre-expanding said beads by means of steam, conveying said pre-expanded beads by a heated atmosphere to transfer moisture from said beads to said atmosphere and to heat said beads, and separating said moisture laden atmosphere from said beads.

3. A method of preparing expandable polystyrene beads for molding, which comprises, applying steam to said beads, whereby said beads become pre-expanded and wet, pneumatically conveying said wet, pre-expanded beads by high velocity heated air to an elevated zone with the moisture from the beads being transferred to the atmosphere and the beads being heated by the atomsphere during said transfer, and separating said moisture laden air from said beads by means of gravity.

4. A method as defined in claim 3, wherein said gravity separation is effected by reducing the velocity of said air to allow said beads to gravitate to a lower position.

5. A method of preparing expandable polystyrene beads for molding, which comprises, applying steam to said beads, whereby said beads become pre-expanded and wet, pneumatically conveying said wet, pre-expanded beads by high velocity heated air with the moisture from the beads being transferred to the atmosphere and the beads being treated by the atmosphere during said transfer, and separating said moisture laden air from said beads.

References Cited by the Examiner

UNITED STATES PATENTS 3,013,996  12/61  Pollard et al. _____ 264—50

OTHER REFERENCES

Fritz Stastny: "New Methods for the Fabrication of Styropor," Badische Aniline and Soda-Fabrik A. G., reprinted from "Der Plastverarbeiter, 7,242–250 (1955)," pages 4–8.

MURRAY TILLMAN, *Primary Examiner.*

L. J. BERCOVITZ, *Examiner.*